May 12, 1925.
J. R. THOMPSON, SR., ET AL
1,537,568
PROPORTIONAL GAS SAMPLE COLLECTOR
Filed June 13, 1923  2 Sheets-Sheet 1
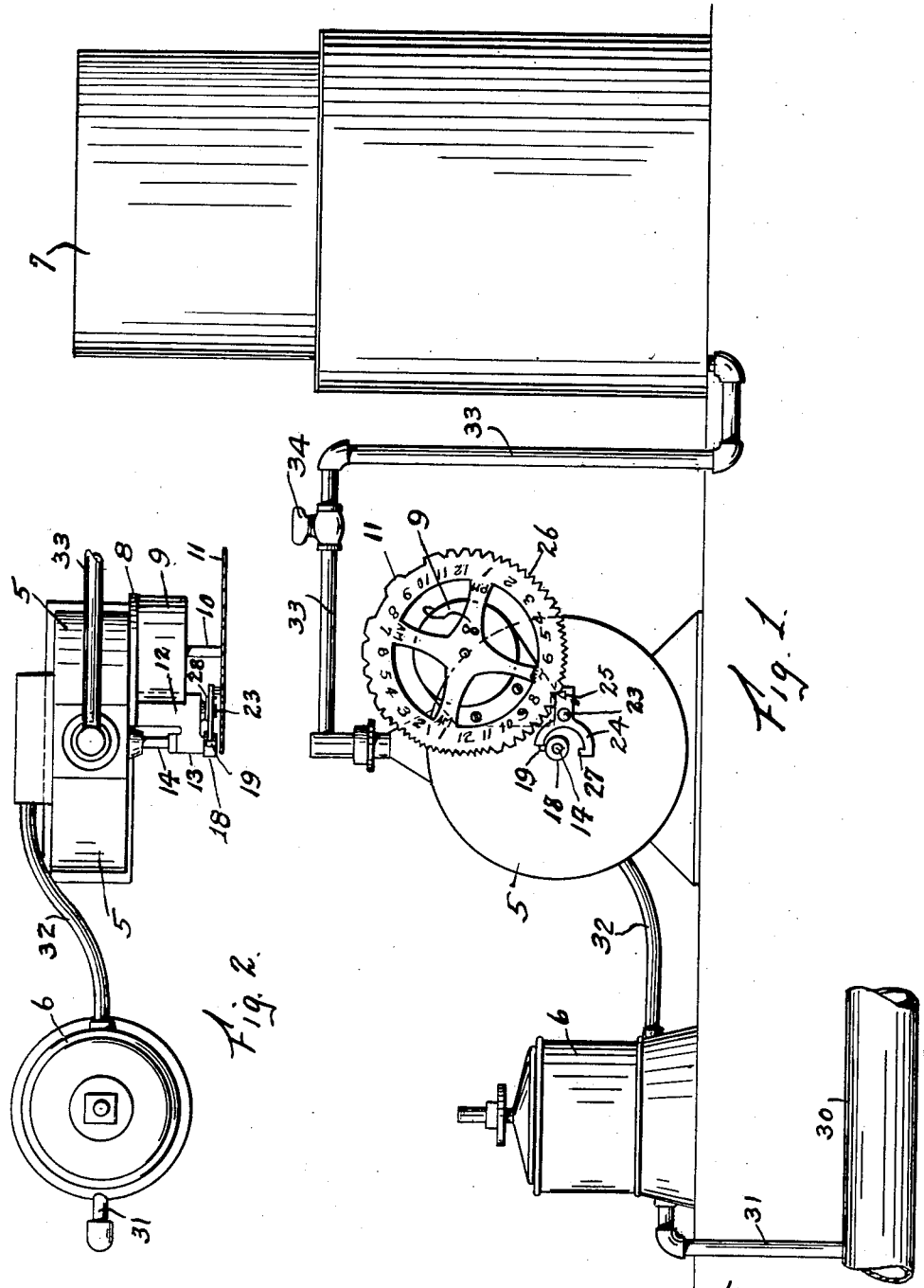
INVENTORS
JOHN R. THOMPSON, SR.
JOHN R. THOMPSON, JR.
by Frank Waterfield
ATTORNEY.

May 12, 1925.

J. R. THOMPSON, SR., ET AL 1,537,568

PROPORTIONAL GAS SAMPLE COLLECTOR

Filed June 13, 1923

INVENTORS
JOHN R. THOMPSON, SR.
JOHN R. THOMPSON, JR.

by Frank Waterfield

ATTORNEY.

Patented May 12, 1925.

1,537,568

UNITED STATES PATENT OFFICE.

JOHN R. THOMPSON, SR., AND JOHN R. THOMPSON, JR., OF HANFORD, CALIFORNIA.

PROPORTIONAL-GAS-SAMPLE COLLECTOR.

Application filed June 13, 1923. Serial No. 645,214.

*To all whom it may concern:*

Be it known that we, JOHN R. THOMPSON, Senior, and JOHN R. THOMPSON, Junior, citizens of the United States, and residents of Hanford, in the county of Kings, State of California, have invented certain new and useful Improvements in Proportional-Gas-Sample Collectors, of which the following is a specification.

Our device relates to a sample collector for the distribution systems of gas generating plants and the object thereof is to provide a device by means of which the weighted average of the gas distributed by the generating plant for each twenty-four hours may be determined.

A further object is to provide a device for the above purpose so constructed and arranged that it will automatically collect, and store in a gasometer, samples of gas from a gas main through which varying quantities of gas are flowing each hour, in such a manner that the samples collected are proportional to the amount flowing through the main.

Other objects and advantages will appear hereinafter and, while we have shown and will describe our preferred form of our invention, we wish it understood that we do not limit ourselves to such preferred form but that various changes and adaptations may be made therein without departing from the spirit of our invention.

In the drawings accompanying and forming a part hereof:

Fig. 1 is a side elevation of our device in its operative position.

Fig. 2 is a top plan of a portion of Fig. 1.

Figure 4:
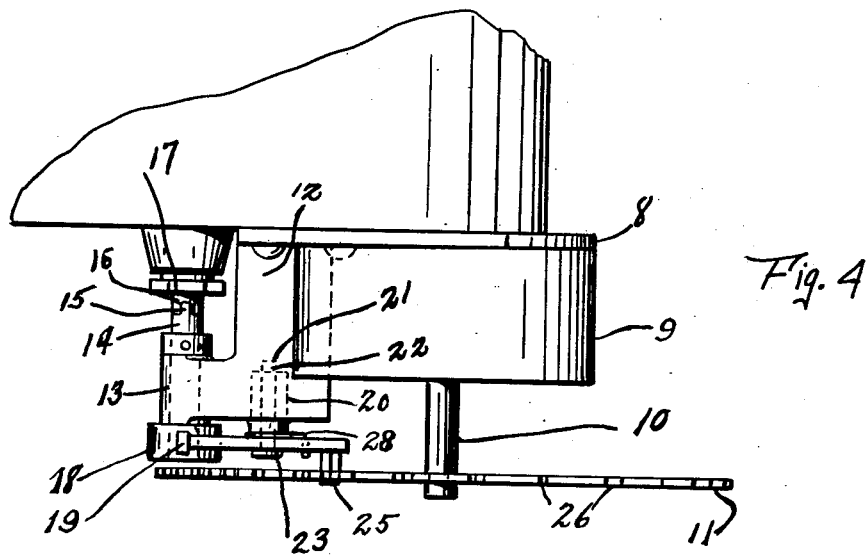
Fig. 4 is a top plan of Fig. 3.
Figure 3:
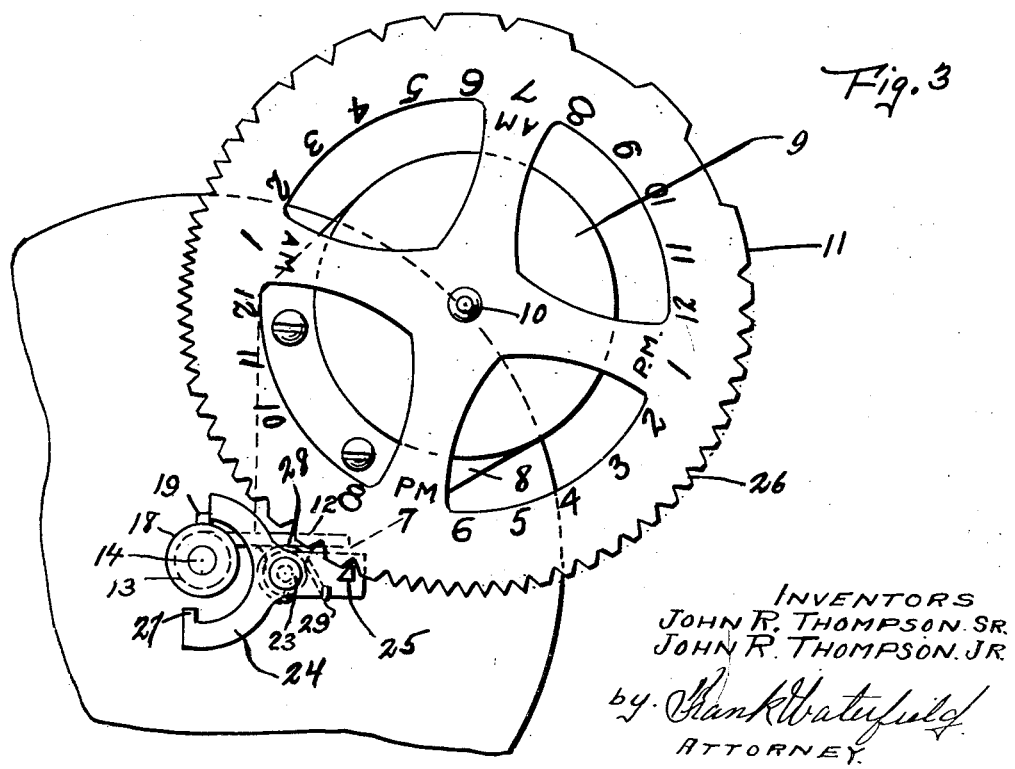
Fig. 3 is an enlarged side elevation of a portion of our device.

Referring to the drawings 5 represents a wet gas meter of any approved form, 6 a pressure regulator also of any approved construction, and 7 a gasometer. Mounted upon the side of the casing of meter 5 is a bracket 8 upon which is mounted a casing 9 carrying a clock works of any approved construction, by means of which the shaft 10 carrying the time wheel 11 is caused to make one complete revolution each twenty-four hours. Extending outwardly from bracket 8, at the lower end thereof, is a standard 12, substantially L-shaped in top plan, upon the end of the short leg of which is provided a bearing 13 in which is revolubly mounted a shaft 14. The inner end of shaft 14 terminates in a tongue 15 which is adapted to be received in a recess 16 in the outer end of the meter shaft 17. Rigidly mounted upon the free end of shaft 14 is a drum 18 provided with a radially extending stud 19. Depending downwardly from the under side of standard 12 is a bearing 20 in which is revolubly mounted a pintle 21 held positioned by a pin 22 at the inner side of bearing 20. The other end of pintle 21 terminates in a head 23, and rockably mounted upon pintle 21, between head 23 and the outer end of bearing 20, is an escapement member 24. Member 24 is substantially Y-shaped in side elevation and has extending outwardly from one side of the single leg thereof a triangular shaped stud 25 adapted for engagement with the notches 26 in time wheel 11. The other ends of member 24 extend outwardly and pass on either side of drum 18, the upper leg terminating just short of the vertical center of drum 18, and the lower leg extending to just beyond the vertical center of drum 18 and terminating in an upturned hook 27. A spring 28 passes around bearing 20 and has one end secured thereto, and has its other end extending outwardly and downwardly and terminating in a hook 29 which bears against the under side of member 24 and serves to hold stud 25 in engagement with wheel 11.

In the operation of our device the regulator 6 being connected to the gas main 30 by pipe 31 and to meter 5 by pipe 32, meter 5 being connected to gasometer 7 by pipe 33 provided with a control cock 34, the pressure in the main 30 being greater than in the gasometer 7 permits the gas to flow through the regulator 6, meter 5, and into gasometer 7, it being understood that regulator 6 is adjusted to conform to the weight of gasometer 7 and that this pressure is too low to blow the water seal in meter 5 when the drum is prevented from rotating by the escapement. It will also be noted that the gas pressure has at all times free access to meter 5. Time wheel 11 is notched with notches 26 to correspond with the gas output. The wheel is divided into twenty-four parts, one for each hour, and each part is subdivided or notched to conform with the time and the amount of hourly output. Each notch in wheel 11 permits one revolution of the drum in meter 5 and each revolution of the drum passes one-tenth cubic foot of gas. For instance, the time wheel shown in the drawings is provided with a notch for each two thousand cubic feet per hour, and during the hours that less than two thousand cubic feet are used notches are cut proportionately to the amount that went out and two thousand cubic feet per hour. As wheel 11 rotates the notches permit escapement 24 to oscillate, thereby permitting drum 18, and with it the drum of meter 5, to make a one-half turn for each movement of member 24, the notches in wheel 11 being so arranged as to permit one-half rotations of the meter drum the required number of times to admit the proportionate amount of gas from the gas main 30 to gasometer 7 corresponding to the amount of gas flowing through the main.

Having described our invention, what we claim is:

1. A proportional gas sample collector comprising a meter, a pressure regulator, and a gasometer; and means to control the operation of said meter to permit varying quantities of gas to flow into said gasometer at predetermined times, said means comprising a power dirven element and escapement mechanism for controlling the rotation of said meter.

2. A proportional gas sample collector comprising a meter and a gasometer; a connection from said meter to a gas main; and a time controlled mechanism controlling the operation of said meter.

3. In a proportional gas sample collector having a meter and a gasometer, means to control the operation of said meter comprising a time operated escapement adapted to permit a predetermined number of revolutions of said meter during a predetermined period of time.

4. In a proportional gas sample collector the combination of a meter; a pressure regulator and a storage tank; a connection from said pressure regulator to a gas main; a connection between said pressure regulator and the inlet of said meter; a connection from the outlet of said meter to said storage tank; and a time controlled mechanism for permitting the operation of said meter at predetermined times, the length of the period of said operation being determined by the time controlled mechanism.

5. In a proportional gas sample collector, including a pressure regulator, a meter and a gasometer, the combination of a time controlled element and mechanism operated by said time controlled element to permit rotation of said meter at predetermined times and in varying amounts.

6. A proportional gas sample collector comprising a pressure regulator, a meter and a storage tank; a connection from said pressure regulator to a gas main; a connection from said pressure regulator to the inlet of said meter; a connection from the outlet of said meter to said storage tank; a power driven element; a measuring wheel operated by said element; an escapement operated by said measuring wheel adapted to obstruct the operation of said meter at predetermined times; and means upon said measuring wheel for rendering said escapement mechanism inoperative for a predetermined period of time.

7. A proportional gas sample collector comprising a pressure regulator, a meter and a gasometer; a connection from one side of said pressure regulator to a gas main; a connection from the other side of said pressure regulator to the inlet of said meter; a connection from the outlet of said meter to said gasometer; means to prevent the passage of fluid through said last connection; a power driven element; a toothed wheel carried by said power driven element; and a ratchet connection controlled by said toothed wheel adapted during its operation to alternately permit and prevent the operation of said meter.

8. The method of accurately measuring and sampling the product from a gas main consisting in passing a portion of said product at a uniform pressure through a meter at a rate at all times bearing a fixed ratio to the rate of the product.

9. The method of accurately measuring and sampling the product from a gas main consisting in passing a portion of said product at uniform pressure through a meter in varying amounts, the variation in said amounts being at all times directly proportional to the rate of the product.

In witness that we claim the foregoing we have hereunto set our hands this 17th day of May, 1923.

JOHN R. THOMPSON, Sr.
JOHN R. THOMPSON, Jr.